United States Patent [19]

Lown et al.

[11] Patent Number: 5,735,969
[45] Date of Patent: Apr. 7, 1998

[54] METHOD OF PRODUCING ACICULAR MAGNETIC ALLOY PARTICLES

[75] Inventors: Jean A. Lown, St. Paul, Minn.; Yasutaka Ota, Hiroshima, Japan; Kenji Okinaka, Hiroshima, Japan; Hirofumi Kawasaki, Hiroshima, Japan

[73] Assignees: Imation Corp., Oakdale, Minn.; Toda Kogyo Corp., Hiroshima, Japan

[21] Appl. No.: 612,517

[22] Filed: Mar. 7, 1996

[51] Int. Cl.$^6$ ....................... H01F 1/03
[52] U.S. Cl. ....................... 148/105; 75/348
[58] Field of Search ............... 148/105; 75/348, 75/349, 351, 369

[56] References Cited

U.S. PATENT DOCUMENTS

| | | | |
|---|---|---|---|
| 3,520,676 | 7/1970 | Stahr | 75/348 |
| 4,133,677 | 1/1979 | Matsui et al. | |
| 4,318,735 | 3/1982 | Mishima et al. | |
| 4,608,093 | 8/1986 | Umemura et al. | |
| 5,151,115 | 9/1992 | Tamai | |
| 5,188,898 | 2/1993 | Tagawa et al. | |
| 5,252,380 | 10/1993 | Nakazumi et al. | |
| 5,260,132 | 11/1993 | Nakazumi et al. | 428/403 |

FOREIGN PATENT DOCUMENTS

| | | | |
|---|---|---|---|
| 0633564 | 1/1995 | European Pat. Off. | |
| 52-054998 | 5/1977 | Japan. | |
| 56-016604 | 2/1981 | Japan. | |
| 57-019301 | 2/1982 | Japan. | |
| 61-154112 | 7/1986 | Japan. | |
| 62-112702 | 5/1987 | Japan. | |
| 62-112703 | 5/1987 | Japan. | |
| 62-155503 | 5/1987 | Japan. | |
| 1-172501 | 7/1989 | Japan | 148/105 |
| 03-174704 | 7/1991 | Japan. | |
| 3-169001 | 7/1991 | Japan. | |
| 04-034902 | 2/1992 | Japan. | |
| 04-157704 | 5/1992 | Japan. | |
| 4-47962 | 8/1992 | Japan. | |
| 05-234734 | 9/1993 | Japan. | |
| 06-176909 | 6/1994 | Japan. | |
| 7-22224 | 1/1995 | Japan. | |

*Primary Examiner*—John Sheehan
*Attorney, Agent, or Firm*—Susan Moeller Zerull

[57] ABSTRACT

The present invention is a method for making highly stable magnetic alloy particles with high coercivities and high saturation magnetization comprising the steps of:

a) providing a precursor selected from the group consisting of iron oxide hydroxide particles and iron oxide particles, wherein the precursor particle comprises from about 15 to about 45 atomic % Co based on amount of Fe present, b) reducing the precursor particles to magnetic alloy particles, c) passivating the magnetic alloy particles in an oxygen-containing atmosphere at a temperature between about 20° and 100° C., d) annealing the passivated magnetic alloy particles in an inert atmosphere at a temperature from about 120° to about 450° C., and e) further oxidizing the annealed magnetic alloy particles in an oxygen-containing atmosphere.

13 Claims, No Drawings

METHOD OF PRODUCING ACICULAR MAGNETIC ALLOY PARTICLES

FIELD OF THE INVENTION

This invention relates to a method of manufacturing acicular magnetic alloy particles.

BACKGROUND OF THE INVENTION

With the development of smaller and more light-weight magnetic recording and playback equipment, performance requirements for magnetic recording media, such as magnetic tapes and magnetic disks, are becoming more demanding. Higher recording density and higher output performance, in particular, improved frequency characteristics and reduced noise level, are demanded. In order to produce such high performance magnetic recording media, fine magnetic pigment particles with high coercivity ($H_c$) and saturation magnetization ($\sigma s$) are required. In addition, a low degree of deterioration in coercivity and saturation magnetization are also necessary to prevent deterioration of the performance of the magnetic recording media over time.

Magnetic metal alloy particles have been produced for use in high density magnetic recording media. These materials, frequently, are produced by heating a raw material, typically iron oxide hydroxide (FeOOH) or iron oxide, in the presence of a reducing agent. The resulting particles have very high surface activity levels because of the fineness of the particles. When these particles are exposed to air, they react rapidly with oxygen generating a great deal of heat. This oxidation reaction converts a portion of the particle to an oxide, resulting in a significant deterioration in the magnetic properties.

In order to avoid this undesirable, rapid oxidation, a passivation method (slow, controlled oxidation) has been used to provide a thin oxide layer on the surface of the particle. However, while this slow oxidation process prevents the undesirable rapid oxidation, stability remains inadequate. See Japanese Kokai Patent Application No. Sho 61[1986]-154112. Deterioration in the coercivity and saturation magnetization occurs gradually with time.

In addition, acicular magnetic particles of very small dimensions, in particular having diameters less than about 0.1 μm, have higher coercivity and show a high degree of improvement in noise level over similar, larger sized particles. Unfortunately, the thin oxide layer provided in the passivation step becomes a larger proportion of such desirable small particles merely due to surface to volume ratios. Since an increased proportion of the particle is an oxide film layer, saturation magnetization decreases significantly. In addition, the oxidation stability attained when passivation oxidation is carried out by conventional methods is insufficient. This also adds to the deterioration in the coercivity and saturation magnetization over time.

Methods have been proposed to reduce the deterioration in saturation magnetization over time. Some of these methods are: a method for heat treating in an inert atmosphere at temperatures of 100°–500° C. after forming an oxide layer by a passivation oxidation step (Japanese Kokai Patent Application No. Sho 61[1986]-154112; a method for annealing, after the initial oxidation process, in an inert gas at 80°–600° C. for 0.5–24 hours followed by a further oxidation process (Japanese Kokoku Patent Application No. Hei 2[1990]-46642); and a method comprising passivation oxidation, followed by heat treatment in an inert gas at 150°–600° C. for 0.2–24 hours, followed by further oxidation in a fluidized bed reactor (Japanese Kokai Patent Application No. Hei 3[1991]-169001). These references do not teach the inclusion of cobalt in the magnetic alloy.

Other attempts to improve properties of the magnetic metal alloys include depositing cobalt ions or cobalt (II) hydroxide to the precursor particles followed by reduction to the magnetic alloy (Japanese Kokai Patent Application Nos. Hei 1[1989]-257309 and Sho 56[1981]-16604). See also Japanese Kokai Patent Application Nos. Sho 52[1977]-121799; Hei 4[1992]-47962; and Japanese Kokai Patent Application No. Hei 3[1991]-49026. These references do not teach that the particles may be annealed in an inert atmosphere after a passivation of the magnetic alloy. These references do not teach that coercivity stability is improved by the inclusion of cobalt.

SUMMARY OF THE INVENTION

The present inventors have discovered a method of manufacture which provides acicular magnetic alloy particles which have high coercivity (Hc), high saturation magnetization ($\sigma s$), and low deterioration in both Hc and $\sigma s$ over time.

While some references, see especially JP 2-46642, JP 3-169001, and JP 61-154112, teach that the saturation magnetization stability may be improved by annealing in an inert atmosphere, Applicants have discovered that the processes as taught by these references also cause a greater decrease in coercivity with time, i.e. poorer coercivity stability. Surprisingly, Applicants have found that when precursor particles have relatively high cobalt levels and the particles are reduced, passivated by oxidation, annealed in an inert atmosphere, and then subjected to a second oxidation step, the resultant magnetic alloy particles have the desired properties.

Specifically, the method comprises the steps of:

a) providing a precursor selected from the group consisting of iron oxide hydroxide particles and iron oxide particles, wherein the precursor particle comprises from about 15 to about 45 atomic % Co based on mount of Fe present, b) reducing the precursor particles to magnetic alloy particles, c) passivating the magnetic alloy particles in an oxygen-containing atmosphere at a temperature between about 20° and 100° C., d) annealing the passivated magnetic alloy particles in an inert atmosphere at a temperature from about 120° to about 450° C., and e) further oxidizing the annealed magnetic alloy particles in an oxygen-containing atmosphere.

DETAILED DESCRIPTION OF THE INVENTION

The precursor particles used in this method preferably have a major axis diameter of 0.05–0.18 μm, more preferably 0.08–0.15 μm. The precursor particles are acicular. The precursor particles preferably have an aspect ratio (major axis:minor axis) of 4 or higher, more preferably about 4–10, and most preferably about 5–8. This includes spindle-shaped, column-shaped, rice-grain shaped particles, etc. Spindle-shaped particles having a narrow size distribution and few branched particles are preferred because they are more likely to yield magnetic alloy particles with high coercivity and saturation magnetization. If the aspect ratio is below 4, high coercivity is difficult to attain. If the aspect ratio is above 10, high saturation magnetization is difficult to attain.

The precursor may by iron oxide hydroxide particles or iron oxide particles. Examples of iron oxide hydroxide particles include goethite, akaganite, lepidocrocite, etc. Goethite is especially preferred. Goethite can be produced, for example, by providing a wet oxidation of a suspension of precipitate produced by mixing a ferrous salt and an alkali hydroxide and/or alkali carbonate. Examples of iron oxide particles include hematite, maghematite, magnetite, berthollide $((FeO)_xFe_2O_3$ where $0<x<1)$, etc. Hematite can be produced, for example, by thermal dehydration of goethite. Magnetite can be produced, for example, by thermal reduction of hematite. Berthollide can be produced, for example, by partial thermal oxidation of the magnetite or by partial thermal reduction of hematite.

The precursor particles comprise about 15–45 atomic %, preferably 20–45 atomic %, Co based on amount of Fe present, i.e. 100x(atoms of Co/atoms of Fe). When less than 15 atomic % cobalt is used, the improvement in stability of coercivity in the magnetic alloy product is not attained. When more than 45 atomic % cobalt is used, saturation magnetization of the magnetic alloy product begins to decrease.

The cobalt-containing iron oxide and iron oxide hydroxide particles may be produced by any known method. For example, according to one preferred method, cobalt containing iron oxide hydroxide may be obtained by adding a cobalt salt during the synthesis process of the iron oxide hydroxide. Alternatively, cobalt could be deposited on the surface of the precursor particles by adding a cobalt salt to an aqueous suspension of the precursor particles and adjusting the pH. Such methods may also be used in combination. When used in combination, it is desirable to add 70% or more, more preferably 80% or more, of the cobalt during the iron oxide hydroxide synthesis reaction because that method is believed by the Inventors to provide a more uniform iron/cobalt alloy.

In addition to Fe and Co, other elements, such as Al, Ni, B, Zn, P, Nd, Y, La Si, Ca, etc., may also be included in the precursor particles as desired. Al, B, Si, Nd, Y, and La are especially useful as anti-sintering agents. Each individual element may be used in amounts of 0.1 to 15 atomic % based on amount of Fe. The total amount of these elements may be from about 3 to 30 atomic %, more preferably 5 to 25 atomic %, based on the amount of Fe. These additional elements may be added by any known method, including those methods mentioned above for adding Co.

The precursor particles are preferably thermally reduced in a hydrogen-containing atmosphere at temperatures of about 350° to about 600° C. to form a magnetic alloy particle. The magnetic alloy particle preferably has a major axis diameter of 0.04–0.12 μm and an aspect ratio in the range from 4–9. Suitable hydrogen-containing atmospheres include hydrogen gas, or a mixture of hydrogen and an inert gas such as nitrogen. If the temperature is too low the degree of reduction is insufficient and the resulting magnetic alloy particles do not have the desired level of saturation magnetization. If the temperature is too high sintering occurs, and coercivity of the magnetic alloy particle is inadequate due to particle shape.

A passivation step is carded out by slowly oxidizing the magnetic alloy product of the reduction step. The passivation, preferably, is carried out at temperatures from about 20° to about 100° C., preferably 25°–60° C., in an oxygen containing atmosphere. When the temperature is below 20° C., the thickness of the oxide layer will not be sufficient to protect the particle from deterioration of the saturation magnetization over time. When the temperature exceeds 100° C., too much oxide is formed and the saturation magnetization of the magnetic alloy decreases. A preferred oxygen containing atmosphere comprises air mixed with an inert gas such as nitrogen. The oxygen containing atmosphere may be humidified if desired. Suitable concentrations of water vapor are in the range of 0.3–50 $g/m^3$, more preferably 0.3–20 $g/m^3$.

While a constant oxygen concentration may be used, preferably, the oxygen concentration is slowly increased with the progress of the oxidation. This allows the treatment to be performed in a shorter period of time than if the oxygen level is held constant. Preferably the initial oxygen concentration is 0.02–1.0 volume %, more preferably 0.02–0.5 volume %, based on total volume of the gas supply. If the oxygen concentration is less than 0.02%, the passivation process may require a long time. Initial oxygen concentrations greater than 1.0 volume % may cause rapid oxidation and nonuniform oxide layers. After initial oxidation has occurred, however, the oxygen concentration may be in the range for 0.02 to 21.0 volume %, preferably 1.0 to 21.0 volume %. If the concentration is higher than 21.0 volume % too much oxidation may occur or the oxidation may occur too rapidly.

The passivated particles are then annealed at a temperature of 120° to 450° C. in an inert gas atmosphere. Examples of suitable inert gases include nitrogen, argon, helium, etc., or mixtures of such gases. The inert gas may be also include water vapor in amounts from 0.3–50 $g/m^3$, preferably 0.3–20 $g/m^3$. When the temperature is below 120° C. the stability of saturation magnetization is not adequate. When the temperature exceeds 450° C., the saturation magnetization becomes low and the coercivity stability begin to deteriorate.

Following the annealing step, the particles are preferably subjected to a further oxidation process to dissipate active locations formed as a result of diffusion of oxygen during the annealing process. This second oxidation step preferably is a slow oxidation. This further stabilizes the magnetic alloy particles. Such an oxidation step, preferably, is performed in an oxygen containing atmosphere at a temperature less than 60° C. If the temperature exceeds 60° C., too much oxidation may occur, leading to a deterioration in saturation magnetization. The oxygen containing gas may be air or a mixture of air with an inert gas. Preferably, concentration of oxygen during at least a part, if not all, of this treatment step, is lower than the concentration used during the initial oxidation step.

All process steps may be carried out in the reduction chamber after the thermal reduction step. Alternatively, after the reduction step, the magnetic alloy particles can be transferred under an inert atmosphere to a separate reaction vessel prior to the passivation and annealing steps.

The particles resulting from the process of this invention preferably have a major axis diameter in the range of 0.04–0.12 μm, more preferably 0.06–0.1 μm. When the major axis is less than about 0.04 μm the proportion of the particle which is the oxide passivation layer is increased and it becomes difficult to attain satisfactory saturation magnetization levels. When the major axis is greater than about 0.12 μm, high coercivities are difficult to attain.

Similarly, if the minor axis diameter is too small, the particle approaches super paramagnetism, and the coercivity and saturation magnetizations are reduced. Therefore, the particles preferably have an aspect ratio (major axis:minor axis) of 4 or higher, more preferably about 4–10, and most preferably about 5–8. This includes spindle-shaped, column-shaped, rice-grain shaped particles, etc. Spindle-shaped particles are preferred because they are easier to produce in a narrow size distribution and without substantial occurrence of dendrites. Thus, it is easier to obtain spindle shape particles with high coercivity and saturation magnetization. If the aspect ratio is below 4, high coercivity is difficult to attain. If the aspect ratio is above 10, high saturation magnetization is difficult to attain.

The metal alloy particles produced by this method comprise about 15–45 atomic %, preferably 20–45 atomic %, Co based on amount of Fe present, i.e. 100x(atoms of Co/atoms of Fe). When less than 15 atomic % cobalt is used, the improvement in stability of coercivity is not attained. When more than 45 atomic % cobalt is used, saturation magnetization begins to decrease.

Preferably, these metal alloy particles have coercivities greater than 1800 Oe, more preferably from 1800 to 2500 Oe, and most preferably 2000 to 2400 Oe. When coercivities are less than 1800 Oe, magnetic recording media made with the particles have poorer frequency characteristics. When the coercivity exceeds 2500 Oe, some recording-playback heads are unsuitable. The saturation magnetization of the metal alloy particles made by the process, preferably, is greater than or equal to 130 emu/g, more preferably greater than 135 emu/g. When saturation magnetization is less than 130 emu/g, a magnetic recording media made from the particles will not have the high magnetic flux density which is desirable for high density magnetic recording media.

The deteriorations in coercivity and in saturation magnetization are determined after an accelerated aging test. The accelerated aging test comprises storing the particles at 60° C. and a relative humidity of 90% for 1 week. The deterioration in coercivity is calculated as a percentage of the initial coercivity as follows: one hundred times the initial coercivity ($Hc_i$) minus the coercivity after aging ($Hc_f$) divided by the initial coercivity ($Hc_i$), i.e. $100x(Hc_i-Hc_f)/Hc_i$. The deterioration in coercivity of the particles made by this process is preferably less than 6%, more preferably less than 4%. The deterioration in saturation magnetization is calculated as a percentage of the saturation magnetization as follows: one hundred times the initial saturation magnetization ($\sigma s_i$) minus the saturation magnetization after aging ($\sigma s_f$) divided by the initial saturation magnetization($\sigma s_i$), i.e. $100x(\sigma s_i-\sigma s_f)/\sigma s_i$. The deterioration in saturation magnetization of the particles made by this process is preferably less than 8%, more preferably less than 6%.

The invention is further explained by the following examples.

EXAMPLES

Testing methods and apparatuses

Coercivity and saturation magnetization were measured by a vibrating sample magnetometer, VSM-3S-15 from Toei Industries, Ltd. in an external field of 10 kOe.

Specific surface area of the particles was measured with a Monosorb MS-11 from Quantachrome Ltd. using the BET method with nitrogen gas.

X-ray diffraction was used to measure the x-ray particle diameter (D110) in the direction normal to the crystal plane (110). The value is calculated based on the Scherrer equation from the diffraction peaks of the crystal plane:

$D110=K\lambda/\beta \cos\theta$, where

K=Scherrer constant, 0.9

$\lambda$=wavelength of x-ray (0.1935 nm)

$\beta$=half-bandwidth of the true diffraction peak after correction for the equipment bandwidth based on the equipment (radians)

$\theta$=diffraction angle

The Si content was measured by X-ray fluorescence Analyzer model 3063 M from Rigaku Denki Industries, Ltd. according to test method JIS K0119.

The content of Al, Co, B, and rare earth elements were measured with an Inductive-coupling Plasma Emission Analyzer, Model SPS 4000 from Seiko Instruments, Inc.

Accelerated aging tests were performed by storing the particles in a constant temperature environment at 60° C. and a relative humidity of 90% for 1 week. Stability was calculated by comparing the results before and after such storage.

Example 1

An aqueous suspension of spindle-shaped goethite particles, having an average major axis diameter of 0.12 μm and an average aspect ratio of 6.9, was provided. The particles contained 21 atomic % Co and 0.20 atomic % Si based on the amount of Fe. Neodymium nitrate 6-hydrate (5.5 weight % based on the weight of the goethite precurser particles), cobalt acetate 4-hydrate (10 weight % based on the weight of the goethite precursor particles), and boric acid (15 wt % based on the weight of the goethite precurser particles) were added to the suspension and stirred for 10 minutes. Aqueous ammonia was add, the pH was adjusted to 9.5, and filtration was performed with a filter press. The particles were washed with water and dried to produce the modified goethite particles.

The goethite particles were heated in air to 400° C. to produce hematite particles. Five hundred grams of the hematite particles were added to a fixed-bed reduction chamber. Hydrogen gas was supplied at a rate of 35 liters/minute and the reactants were heated to 460° C. until the exhaust gas dewpoint reached 30° C. (720 minutes).

The hydrogen gas was replaced with nitrogen gas, and the system was then cooled to 40° C. A gas mixture of 35 L/min of $N_2$ and 0.4 L/min of air humidified with 1 g/$m^3$ of steam was supplied and the temperature was maintained at 40° C. The oxygen concentration was increased stepwise when the heat generation caused by surface oxidation stabilized. The final oxygen concentration was 35 L/min $N_2$ and 3.0 L/min air.

Then, nitrogen alone was supplied at a rate of 35 L/min and the temperature was increased to 250° C. for 1 hour. After cooling the system to 40° C., the second oxidation step was begun. Nitrogen at 35 L/min and air at 0.4 L/min were supplied to the reactor and the temperature was maintained at 40° C. Oxygen concentration was increase stepwise when the heat generation caused by the surface oxidation stabilized. The final oxygen concentration was 35 L/min $N_2$ and 2.0 L/min air. The air supply was stopped and the system was purged with $N_2$.

An electron micrograph of the particles revealed that the particles were spindle shaped with an average major axis of 0.085 μm and an aspect ratio of 6.1. The crystalline size (D110) was 15.9 nm. Cobalt content was 25 atomic % based on amount of Fe. Initial coercivity and saturation magnetization were 2144 Oe and 138.9 emu/g, respectively. After aging, the deterioration in coercivity was 1.4% and the deterioration in saturation magnetization was 4.3%.

Examples 2–12 and Comparative Examples 1–5

Additional magnetic alloy particles were made as in Example 1 but the process conditions were adjusted as shown in Table 1. The results are shown in Table 2. Comparative Examples 1 and 2 demonstrate the negative effects if annealing temperature is either too low or too high. Comparative Examples 3 and 5 demonstrate the negative effects on coercivity if cobalt is not used in the amounts required. Comparative Example 4 demonstrates the negative effects if the particle is not annealed after passivation.

TABLE I

| | | Precursor Particle | | | Manufacturing conditions Thermal Reduction | | | Passivation | | | | Annealing process | Second oxidation process | | |
|---|---|---|---|---|---|---|---|---|---|---|---|---|---|---|---|
| | Type | Co (at %) | Stage at which Co is added and amount (at %) added at that stage | Other elements (at %) | Temp (°C) | Initial O2 conc. (Vol %) | Final O2 conc. (Vol %) | Initial O2 conc. (Vol %) | Final O2 conc. (Vol %) | Steam conc. (g/m²) | Temp (°C) | Temp. (°C) | Initial O2 conc. (Vol %) | Final O2 conc. (Vol %) | Temp. (°C) |
| Appl Ex 2 | Spindle hematite particle | 34.3 | During goethite formation: 30 Deposited on surface of goethite: 4.3 | Si:1.5 B:9.2 y:3.2 | 460 | 0.30 | 2.14 | | | 1.5 | 40 | 300 | 0.24 | 1.50 | 40 |
| Appl Ex 3* | Spindle hematite particle | 29.4 | During goethite formation: 25 Deposited on surface of goethite: 4.4 | Al:6.2 Si:2.0 Y:4.4 | 520 | 0.12 | 5.00 | | | 4.5 | 25 | 180 | 0.12 | 1.90 | 25 |
| Appl Ex 4 | Spindle hematite particle | 41.6 | During goethite formation: 35 Deposited on surface of goethite: 6.6 | Al:3.0 Si:1.5 B:12.3 Nd:2.6 | 470 | 0.18 | 3.50 | | | 0.5 | 40 | 400 | 0.18 | 1.50 | 40 |
| Appl Ex 5 | Spindle hematite particle | 18.0 | During goethite formation: 18 | Al:2.9 B:10.6 Nd:2.0 | 450 | 0.18 | 2.14 | | | — | 25 | 250 | 0.18 | 1.50 | 25 |
| Appl Ex 6 | Spindle hematite particle | 35.0 | During goethite formation: 35 | Al:7.3 Si:1.5 Nd:2.8 | 550 | 0.18 | 2.14 | | | 1.5 | 25 | 300 | 0.18 | 1.50 | 20 |
| Appl Ex 7 | Spindle hematite particle | 16.0 | During goethite formation: 16 | Al:3.0 Si:1.7 B:7.5 Nd:1.4 | 470 | 0.20 | 2.00 | | | 1.0 | 50 | 300 | 0.15 | 1.00 | 30 |
| Appl Ex 8 | Spindle hematite particle | 20.0 | During goethite formation: 20 | Si:2.0 B:10.5 Nd:1.5 | 450 | 0.18 | 2.14 | | | 1.0 | 40 | 200 | 0.18 | 1.50 | 25 |
| Appl Ex 9 | Spindle hematite particle | 37.2 | During goethite formation: 35 Deposited on surface of goethite: 2.2 | Al:3.0 Si:0.5 B:8.0 Y:4.3 | 470 | 0.25 | 2.14 | | | 1.5 | 40 | 250 | 0.20 | 1.50 | 30 |
| Comp Ex 1 | Spindle hematite particle | 25.3 | During goethite formation: 21 Deposited on surface of goethite: 4.3 | Si:2.0 B:11.5 Nd:1.4 | 460 | 0.24 | 1.66 | | | 1.0 | 40 | 80 | 0.24 | 1.11 | 40 |
| Comp Ex 2 | Spindle hematite particle | 25.3 | During goethite formation: 21 Deposited on surface of goethite: 4.3 | Si:2.0 B:11.5 Nd:16 | 460 | 0.24 | 1.66 | | | — | 40 | 550 | 0.24 | 1.11 | 40 |
| Comp Ex 3 | Spindle hematite particle | 8.0 | During goethite formation: 8 | Al:2.9 Si:1.0 B:9.0 | 450 | 0.18 | 2.14 | | | — | 25 | 400 | 0.18 | 1.50 | 25 |
| Appl Ex 10 | Spindle hematite particle | 20.0 | During goethite formation: 20 | Si:2.0 B:10.5 Nd:1.5 | 450 | 1.50 | 2.14 | | | 1.0 | 40 | 200 | 0.18 | 1.50 | 40 |
| Appl Ex 11 | Spindle hematite particle | 20.0 | During goethite formation: 20 | Si:2.0 B:10.5 | 450 | 0.18 | 2.14 | | | 0.5 | 40 | 200 | 2.00 | 2.00 | 25 |

TABLE I-continued

| | | Precursor Particle | | | Manufacturing conditions | | | | | | Annealing process | | Second oxidation process | | |
|---|---|---|---|---|---|---|---|---|---|---|---|---|---|---|---|
| | | | Stage at which Co is added and | | Thermal Reduction | | | Passivation | | | | | Initial | Final | |
| | Type | Co (at %) | amount (at %) added at that stage | Other elements (at %) | Temp (°C.) | Initial O2 conc. (Vol %) | Initial O2 conc. (Vol %) | Final O2 conc. (Vol %) | Steam conc. (g/m²) | Temp (°C.) | process | Temp. (°C.) | O2 conc. (Vol %) | O2 conc. (Vol %) | Temp. (°C.) |
| Comp Ex 4 | Spindle hematite particle | 18.0 | Bertholide added to polyhydric alcohol: 18.0 | Nd:1.5 Al:3.0 Si:1.5 B:9.1 | 460 | 0.30 | 0.30 | 2.14 | — | 25 | — | — | — | — | — |
| Comp Ex 5 | Spindle hematite particle | — | — | Nd:1.5 Al:3.0 Si:1.5 B:8.2 | 480 | 0.30 | 0.30 | 2.14 | — | 40 | 400 | 400 | 0.30 | 1.50 | 30 |
| Appl Ex 12 | Spindle hematite particle | 40.6 | Deposited on surface of goethite: 40.6 | Nd:1.3 Al:3.0 Si:1.5 B:12.3 Nd:2.6 | 470 | 0.18 | 0.18 | 3.50 | 0.5 | 40 | 400 | 400 | 0.18 | 1.50 | 40 |

TABLE 11

| Appl Exs and Comp Exs | Major axis diam (μm) | Minor axis diam (μm) | Aspect ratio | X-ray diam D110 (nm) | Co content (at %) | Al content (at %) | Si content (at %) | B content (at %) | Rare earth content (at %) | Coercivity, Hc (Oe) | Sat. magnetization, σs(emu/g) | Squareness ratio (σr/σs) | ΔHc (%) | Δσs magnetic moment (%) |
|---|---|---|---|---|---|---|---|---|---|---|---|---|---|---|
| Appl Ex 2 | 0.091 | 0.0149 | 6.2 | 17.0 | 34.3 | — | 1.5 | 9.2 | Y:3.2 | 2215 | 144.3 | 0.527 | −0.1 | 4.8 |
| Appl Ex 3 | 0.088 | 0.0147 | 6.0 | 18.1 | 29.4 | 6.2 | 2.0 | — | Y:4.4 | 2081 | 140.0 | 0.520 | −1.6 | −5.9 |
| Appl Ex 4 | 0.074 | 0.0138 | 5.4 | 16.1 | 41.6 | 3.0 | 1.5 | 12.3 | Nd:2.6 | 2100 | 138.0 | 0.521 | 0.0 | 4.0 |
| Appl Ex 5 | 0.099 | 0.0151 | 6.5 | 17.8 | 18.0 | 2.9 | — | 10.6 | Nd:2.0 | 2006 | 136.8 | 0.516 | −3.2 | −3.5 |
| Appl Ex 6 | 0.069 | 0.0135 | 5.1 | 16.8 | 35.0 | 7.3 | 1.5 | — | Nd:2.8 | 2030 | 136.5 | 0.511 | −1.5 | −2.6 |
| Appl Ex 7 | 0.114 | 0.0161 | 7.1 | 18.4 | 16.0 | 3.0 | 1.7 | 7.5 | Nd:1.4 | 1816 | 133.5 | 0.506 | −3.7 | −5.8 |
| Appl Ex 8 | 0.089 | 0.0137 | 6.5 | 15.3 | 20.0 | — | 2.0 | 10.5 | Nd:1.5 | 2050 | 131.0 | 0.512 | −2.0 | 4.3 |
| Appl Ex 9 | 0.092 | 0.151 | 6.1 | 17.4 | 37.2 | 3.0 | 0.5 | 8.0 | Y:4.3 | 2311 | 138.0 | 0.529 | −0.8 | −12.3 |
| Comp Ex 1 | 0.085 | 0.0140 | 6.1 | 15.9 | 25.3 | — | 2.0 | 11.5 | Nd:1.4 | 2110 | 146.0 | 0.520 | −1.0 | −1.8 |
| Comp Ex 2 | 0.085 | 0.0140 | 6.1 | 15.9 | 25.3 | — | 2.0 | 11.5 | Nd:1.6 | 2050 | 126.1 | 0.510 | −6.2 | −1.6 |
| Comp Ex 3 | 0.101 | 0.0150 | 6.7 | 17.2 | 8.0 | 2.9 | 1.0 | 9.0 | Nd:1.5 | 1910 | 125.5 | 0.516 | −10.1 | −1.0 |
| Appl Ex 10 | 0.089 | 0.0137 | 6.5 | 14.8 | 20.0 | — | 2.0 | 10.5 | Nd:1.5 | 1950 | 121.0 | 0.500 | −1.8 | −1.7 |
| Appl Ex 11 | 0.089 | 0.0137 | 6.5 | 14.8 | 20.0 | — | 2.0 | 10.5 | Nd:1.5 | 1995 | 126.5 | 0.507 | −1.9 | −10.2 |
| Comp Ex 4 | 0.093 | 0.0145 | 6.4 | 16.0 | 18.0 | 3.0 | 1.5 | 9.1 | Nd:1.5 | 1930 | 134.0 | 0.500 | −4.0 | −3.2 |
| Comp Ex 5 | 0.086 | 0.0133 | 6.5 | 14.7 | 0.0 | 3.0 | 1.5 | 8.2 | Nd:1.3 | 1790 | 110.3 | 0.498 | −12.3 | −7.2 |
| Appl Ex 12 | 0.072 | 0.0138 | 5.4 | 16.4 | 40.6 | 3.0 | 1.5 | 12.3 | Nd:2.6 | 1850 | 124.0 | 0.498 | −4.2 | −7.2 |

What is claimed is:

1. A method for manufacturing magnetic alloy particles comprising the steps of:
   a) providing a precursor selected from the group consisting of iron oxide hydroxide particles and iron oxide particles, wherein the precursor particle comprises from about 15 to about 45 atomic % Co based on amount of Fe present,
   b) reducing the precursor particles to magnetic alloy particles,
   c) passivating the magnetic alloy particles in an oxygen-containing atmosphere at a temperature between about 20° and 100° C.,
   d) annealing the passivated magnetic alloy particles in an inert atmosphere at a temperature from about 120° to about 450° C., and
   e) further oxidizing the annealed magnetic alloy particles in an oxygen-containing atmosphere.

2. The method of claim 1 wherein the precursor particles have an average major axis diameter in the range from 0.05–0.18 μm and an average aspect ratio greater than 4.

3. The method of claim 1 wherein the precursor particles further comprise antisintering agents.

4. The method of claim 1 wherein the reducing step occurs in a hydrogen containing atmosphere at temperatures from 350° to 600° C.

5. The method of claim 1 wherein the further oxidizing step occurs in an oxygen containing atmosphere at a temperature less than 60° C.

6. The method of claim 1 wherein the concentration of oxygen in the passivating step is slowly increased.

7. The method of claim 6 wherein the initial oxygen concentration is 0.02–1.0 volume % based on total volume of the gas supply.

8. The method of claim 7 wherein the final oxygen concentration is 1.0 to 21.0 volume % based on total volume of the gas supply.

9. The method of claim 1 wherein the precursor comprises from 20 to 45 atomic % Co based on amount of Fe present.

10. The method of claim 1 wherein the precursor is iron oxide hydroxide and at least 70% of the cobalt in the precursor was added during the synthesis of the iron oxide hydroxide.

11. The method of claim 1 wherein the oxygen containing atmosphere in the passivating step contains water vapor.

12. The method according to claim 1 wherein the concentration of water vapor in the oxygen containing atmosphere is in the range of 0.3 to 50 g/m$^3$.

13. A method for manufacturing magnetic alloy particles comprising the steps of:
   a) providing a precursor selected from the group consisting of iron oxide hydroxide particles and iron oxide particles, wherein the precursor particle consist essentially of an iron containing material selected from iron oxide, iron hydroxide and mixtures thereof, from about 15 to about 45 atomic % cobalt based on mount of iron present, and, optionally, an antisintering compound selected from the group consisting of aluminum, boron, silicon, neodymium, yttrium, and lanthanum;
   b) reducing the precursor particles to magnetic alloy particles,
   c) passivating the magnetic alloy particles in an oxygen-containing atmosphere at a temperature between about 20° and 100° C.,
   d) annealing the passivated magnetic alloy particles in an inert atmosphere at a temperature from about 120° to about 450° C., and
   e) further oxidizing the annealed magnetic alloy particles in an oxygen-containing atmosphere.

* * * * *

UNITED STATES PATENT AND TRADEMARK OFFICE
CERTIFICATE OF CORRECTION

PATENT NO.: 5,735,969

DATED: April 7, 1998

INVENTOR(S): Lown et al.

It is certified that error appears in the above-identified patent and that said Letters Patent is hereby corrected as shown below:

Col. 2, line 38, "mount" should be --amount--.

Col. 3, line 61, "carded" should be --carried--.

Col. 11, Table 11, under the last column ($\Delta\sigma$s magnetic moment (%)), Appl Ex 4 should be -- –6.0 --.

Signed and Sealed this

Seventeenth Day of November, 1998

*Attest:*

BRUCE LEHMAN

*Attesting Officer*     *Commissioner of Patents and Trademarks*